(12) United States Patent
Adachi et al.

(10) Patent No.: US 7,901,092 B2
(45) Date of Patent: Mar. 8, 2011

(54) PROJECTION DISPLAY DEVICE HAVING A LEVEL DIFFERENCE CORRECTION SECTION

(75) Inventors: Takaharu Adachi, Higashiosaka (JP); Fumihiko Hamada, Kobe (JP); So Suzuki, Osaka (JP)

(73) Assignee: Sanyo Elctric Co., Ltd, Moriguchi-shi (JP)

( * ) Notice: Subject to any disclaimer, the term of this patent is extended or adjusted under 35 U.S.C. 154(b) by 490 days.

(21) Appl. No.: 12/073,291

(22) Filed: Mar. 4, 2008

(65) Prior Publication Data

US 2008/0218705 A1 Sep. 11, 2008

(30) Foreign Application Priority Data

Mar. 6, 2007 (JP) ................................. 2007-055979
Jun. 12, 2007 (JP) ................................. 2007-155098

(51) Int. Cl.
*G03B 21/14* (2006.01)
(52) U.S. Cl. ......................................................... 353/119
(58) Field of Classification Search .................... 353/50, 353/51, 119, 71, 79
See application file for complete search history.

(56) References Cited

U.S. PATENT DOCUMENTS

2006/0181684 A1* 8/2006 Hermanson et al. ............ 353/31

FOREIGN PATENT DOCUMENTS

JP 5-100312 A 4/1993
JP 2004-258620 A 9/2004

* cited by examiner

*Primary Examiner* — Thanh X Luu
(74) *Attorney, Agent, or Firm* — Westerman, Hattori, Daniels & Adrian, LLP

(57) ABSTRACT

A projection display device comprises a main body cabinet, a projection lens section to which light modulated by a light modulating element entered, and a mirror section for reflecting the light emitted from the projection lens section to a projection plane. A level difference depending on an arrangement shift of the projection lens section and the mirror section is formed on a second side surface facing a first side surface having light projection port of the main body cabinet. Furthermore, the projection display device comprises a level difference correction section for directing the light from the mirror section in a desired direction by correcting the level difference, when the main body cabinet is planed on a plane to be placed, the second side surface facing the plane to be placed.

6 Claims, 19 Drawing Sheets

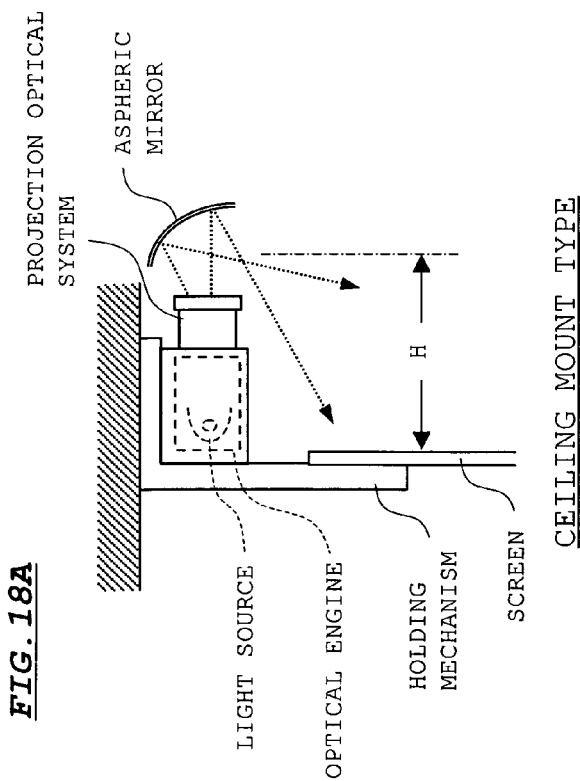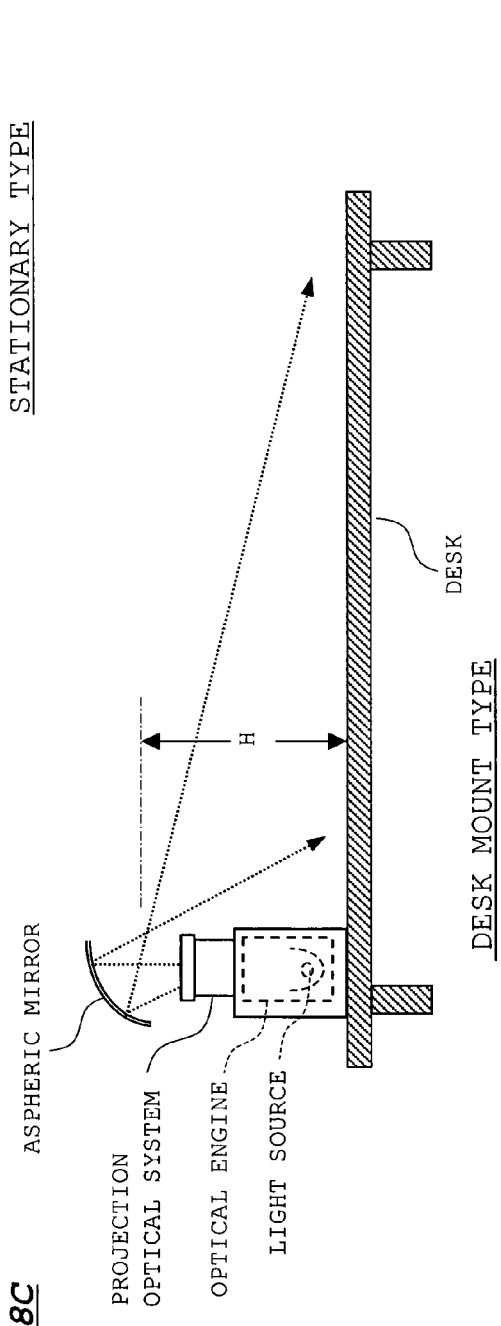

PROJECTION DISPLAY DEVICE HAVING A LEVEL DIFFERENCE CORRECTION SECTION

This application claims priority under 35 U.S.C. Section 119 of Japanese Patent Application No. 2007-055979 filed Mar. 6, 2007, entitled "PROJECTION DISPLAY DEVICE" and Japanese Patent Application No. 2007-155098 filed Jun. 12, 2007, entitled "PROJECTION DISPLAY DEVICE".

BACKGROUND OF THE INVENTION

1. Field of the Invention

The present invention relates to a projection display device for enlarging and projecting light modulated by a display element on a projection plane, and in particular, is preferably used for a projection display device in which an image on the display element is formed as an intermediate image between a projection lens section and a reflection mirror and this intermediate image is enlarged and projected by a reflection plane.

2. Description of the Related Art

Projection display devices (hereafter, referred to as "projectors") for enlarging and projecting an image on a display element (liquid crystal panel, or the like) on a projection plane (screen, or the like) have been commercialized and widely used. In the projectors of this sort, it is desirable to reduce a distance between the screen and the projector body.

To attain this, an arrangement for oblique projection may be used in which a projection optical system is wide-angled, and at the same time, a direction of projection light traveling is oblique to an optical axis of the projection optical system. For example, when a wide-angle lens with a large view angle is used as the projection optical system, and a display element and a screen are shifted in opposite directions to each other with regard to the optical axis of the projection optical system, a projection distance is shortened, and at the same time, oblique projection without distortion can be. achieved. However, with the arrangement as mentioned, a wider-angle lens with a larger view angle is necessary, and therefore, increased costs due to a large-sized lens and a large-sized projector body pose a problem.

On the otherhand, for realization of the reduced projection distance, such an arrangement is also considered that a projection lens section and a mirror are used as a projection optical system, an image on a display element is formed as an intermediate image between the projection lens section and the mirror, and the intermediate image is then enlarged and projected by the mirror.

With the projectors of this sort, various states in use as shown in FIG. 18 are expected. With the latter arrangement, as shown in FIG. 19, since a light source, a projection lens section and a mirror are arranged in a same direction, although the light source directs in a horizontal direction for a ceiling mount type and a stationary type, the light source directs in a vertical direction for a desk mount type, thereby causing problems in a service life of the light source (burner).

By the way, according to the arrangement shown in FIG. 19, light modulated by a panel is shifted in a direction getting away from the screen with regard to an optical axis of the projection lens section (refraction optical system), and the mirror (reflection plane) is shifted in a direction opposite to the direction getting away from the screen. However, contrary to this arrangement, when the panel is shifted in a direction approaching to the screen with regard to the optical axis of the projection lens section (refraction optical system), and the mirror (reflection plane) is shifted in the direction opposite to the direction approaching to the screen, a wider angle of projection light can be further promoted.

However, with this arrangement, a level difference is created on a side surface of a main body cabinet due to shifting of the mirror with regard to the projection lens section. For this reason, when the side surface of the projector is placed on a plane to be placed (in the case of the stationary type shown in FIG. 18B), the projector will be oblique to a horizontal direction, thereby causing a problem that the light cannot be projected to the screen in a smooth manner.

This problem can be eliminated by giving the above-mentioned side surface a uniform plane without any level difference. However, this attempt will create a dead space in the main body cabinet, and such a problem arises that the projector body is large-sized.

SUMMARY OF THE INVENTION

A projection display device according to an aspect of the present invention comprises a projection lens section to which light modulated by a light modulating element is entered; a mirror section for reflecting the light emitted from the projection lens section to a projection plane; a main body cabinet for accommodating the projection lens section and the mirror section, wherein a level difference depending on an arrangement shift of the projection lens section and the mirror section is formed on a second side surface facing a first side surface having a light projection port of the main body cabinet; and a level difference correction section for correcting the level difference to orient the light from the mirror section in a desired direction, when the main body cabinet is placed on a plane to be placed in a state that the second side surface faces the plane.

BRIEF DESCRIPTION OF THE DRAWINGS

The foregoing and other objects and novel features of the present invention will be more fully understood by reading a description of preferred embodiments below with reference to the accompanying drawings as follows:

FIG. 18A is a drawing illustrating a state in use (a ceiling mount type) of the projector;

FIG. 18B is a drawing illustrating a state in use (the stationary type) of the projector;

FIG. 18C is a drawing illustrating a state in use (a desk mount type) of the projector.

Figure 1:
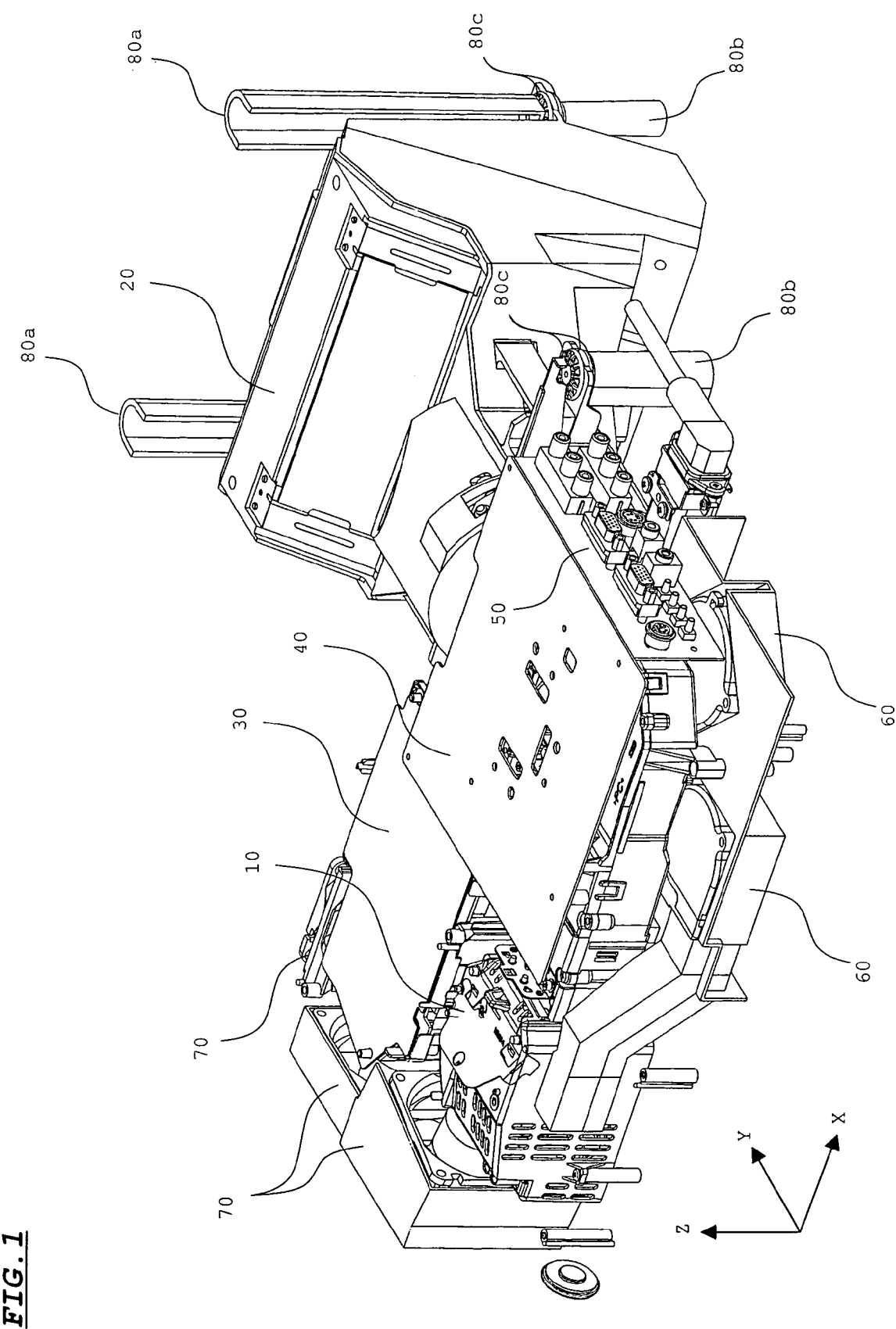
FIG. 1 is a drawing (perspective view) illustrating an internal arrangement of the projector according to an embodiment.

The drawings are merely intended for illustration and do not set any limits to the scope of the present invention.

DESCRIPTION OF THE PREFERRED EMBODIMENTS

Hereinafter, referring to the drawings, an arrangement of a projector according to the embodiment will be described.

Figure 8:
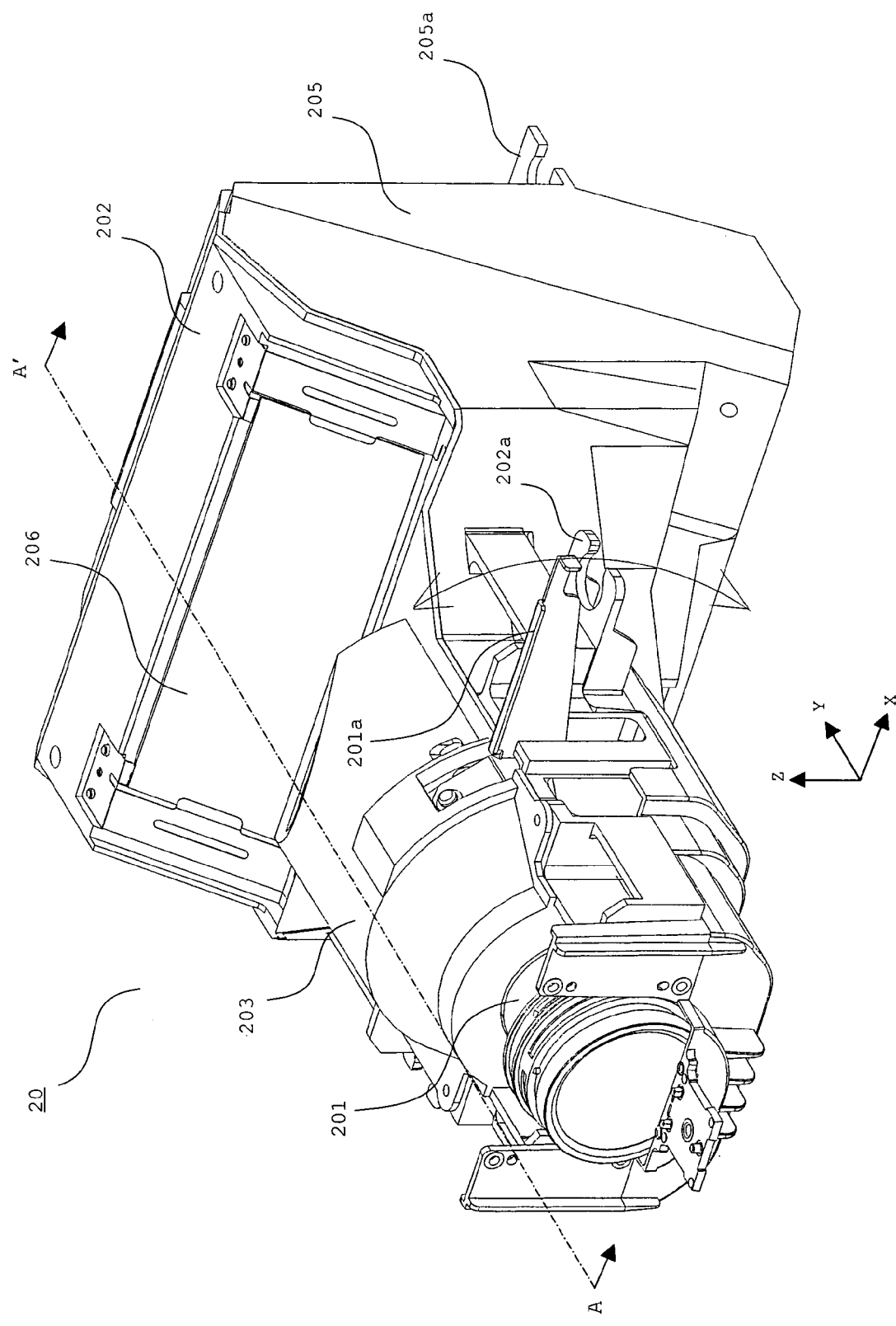
FIG. 8 is a drawing (perspective view) illustrating an arrangement of a projection optical system according to the embodiment.
Figure 9:
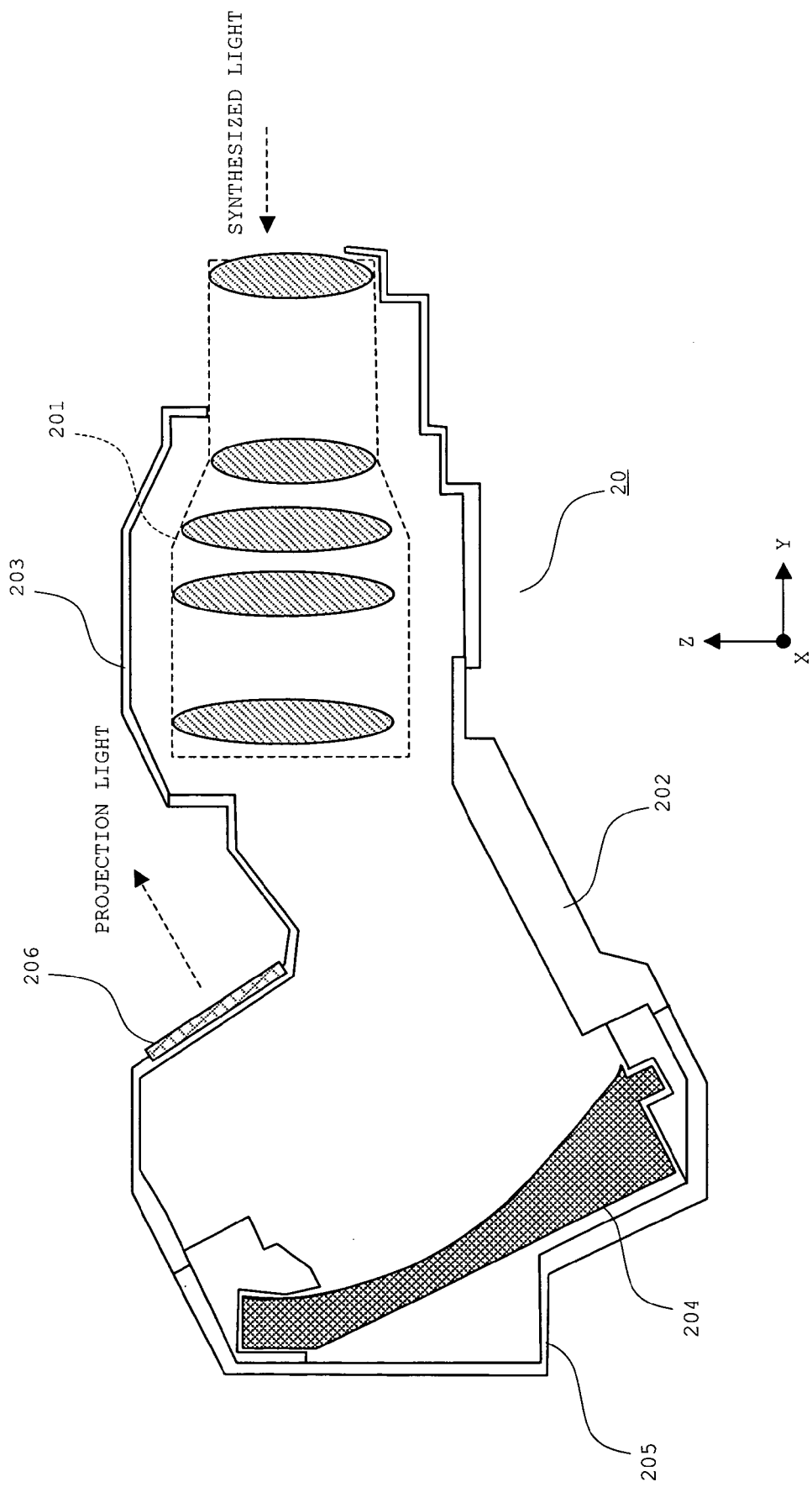
FIG. 9 is a drawing (cross-sectional view) illustrating the arrangement of the projection optical system according to the embodiment.

FIG. 1 through FIG. 7 illustrate an internal arrangement of the projector in which an external cabinet is omitted. FIG. 1 is a perspective view of the internal arrangement showing an external appearance, and FIG. 2, FIG. 3, FIG. 4, FIG. 5, FIG. 6 and FIG. 7 are respectively a top plan view, a bottom plan view, a right side view, a left side view, a front view, and a back view. FIG. 2 through FIG. 7 show the arrangement in a state that a main substrate 40 is removed. FIG. 8 and FIG. 9 are respectively a perspective view and a cross-sectional view (schematic view) of a projection optical system showing an external appearance.

Referring now to FIG. 1 through FIG. 7, the projector comprises an optical engine 10, a projection optical system 20, a power supply unit 30, a main substrate 40, an AV terminal section 50, a suction fan 60, an exhaust fan 70, and an AC inlet 90. Reference number 80a is a boss from a top face side of the cabinet, reference numeral 80b is a boss from a bottom face side of the cabinet, and reference numeral 80c is a bush for vibration absorption.

Figure 2:
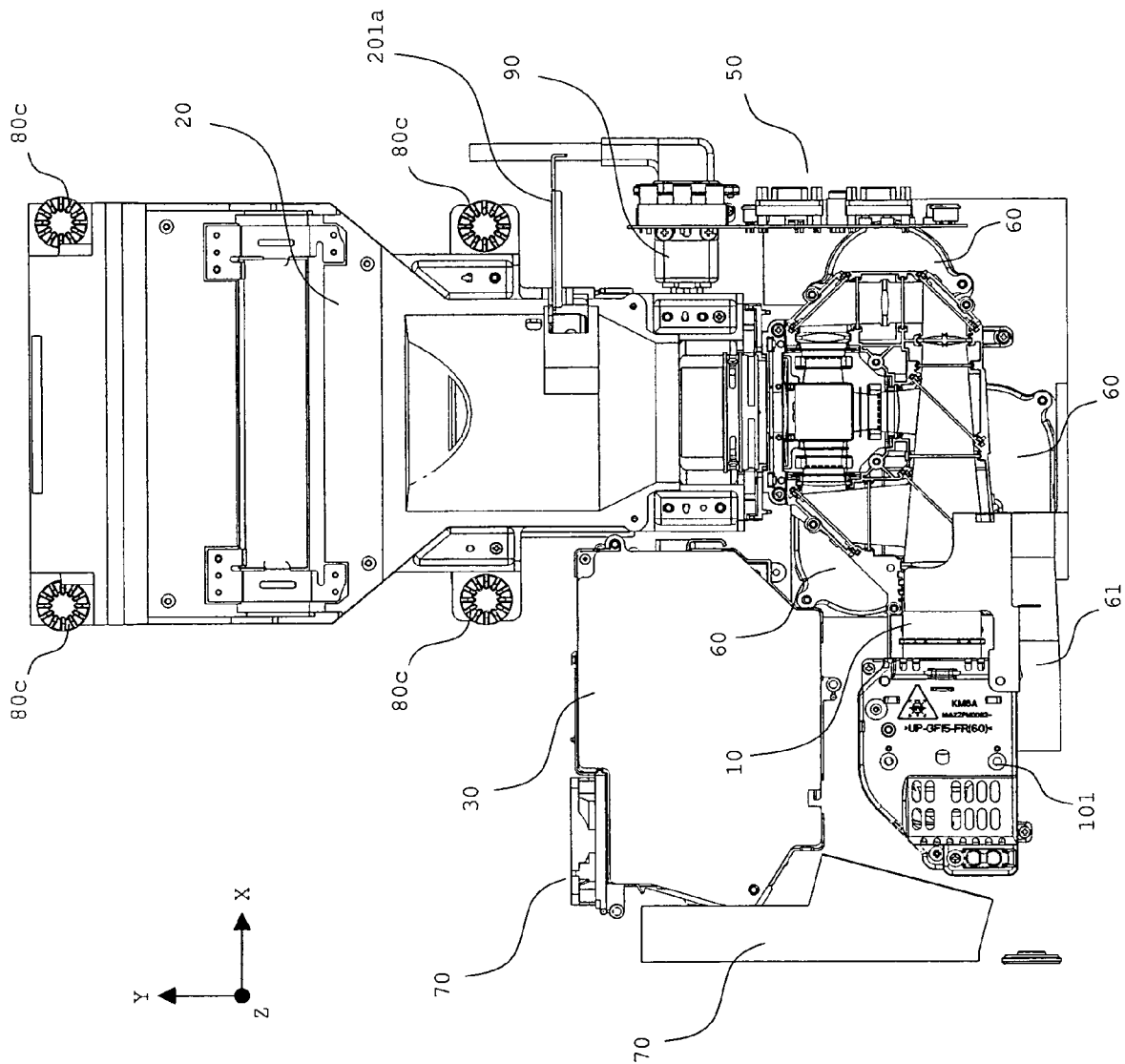
FIG. 2 is a drawing (top plan view) illustrating the internal arrangement of the projector according to the embodiment.
Figure 3:
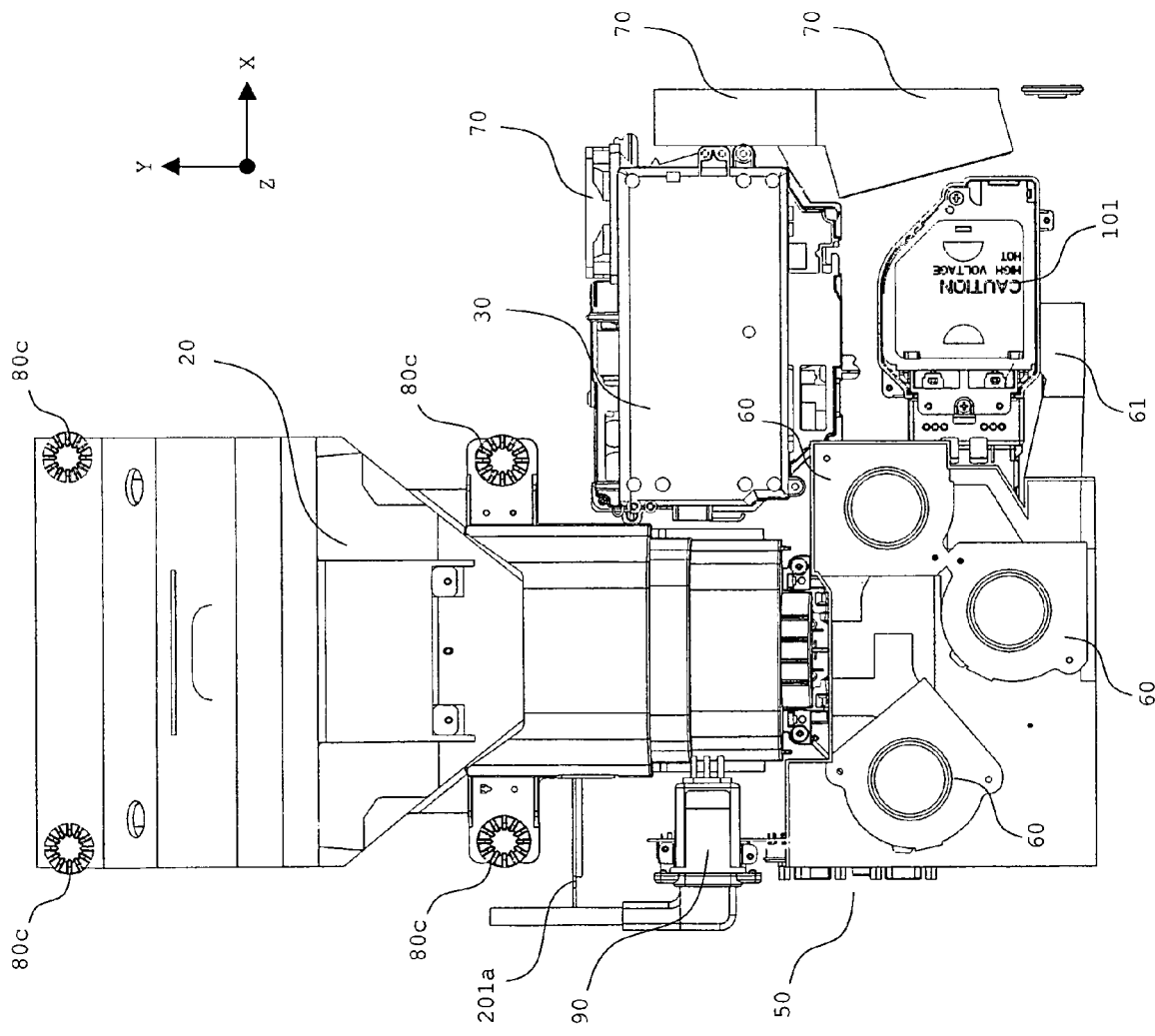
FIG. 3 is a drawing (bottom plan view) illustrating the internal arrangement of the projector according to the embodiment.

In the projection optical system 20, plate-like sections 202a and 205a shown in FIG. 8 are sandwiched between the bosses 80a and 80b via two bushes 80c as shown in FIG. 1, FIG. 2, and FIG. 3 to be mounted in the cabinet. Since the projection optical system 20 is sandwiched via the bush 80c for vibration absorption, shock is hardly conveyed to the projection optical system 20. The projection optical system 20 is supported by the boss 80a from the top face side of the cabinet and the boss 80b from the bottom face side of the cabinet via the bush 80c for vibration absorption, thereby improving supporting strength.

The optical engine 10 separates white light from a light source 101 into light in a blue wavelength band, light in a green wavelength band, and light in a red wavelength band, and at the same time, modulates the light in respective wavelength bands by a corresponding display element (liquid crystal panel) Furthermore, the optical engine 10 executes color synthesis of the modulated light in the respective wavelength bands by a dichroic prism, and emits the synthesized light to the projection optical system 20. As shown in FIG. 2, the light source 101 is disposed so as to illuminate the light in a direction of an X-axis. Furthermore, the projection optical system 20 is disposed so that the optical axis may be positioned in a direction of a Y-axis. An arrangement of the optical engine 10 and a positional relationship between the optical engine 10 and the projection optical system 20 will be described later, referring to FIG. 10.

The power supply unit 30 supplies electric power to the light source 101 and a main circuit 40. AC voltage is input to the power supply unit 30 via an AC inlet 90. The main circuit 40 is a circuit for driving and controlling the projector. As shown in FIG. 1, a circuit substrate for holding the main circuit 40 is disposed on the top face of the optical engine 10 to cover a part of the optical engine 10. Furthermore, an AV (Audio Visual) signal is input to the main circuit 40 via the AV terminal section 50.

Figure 5:
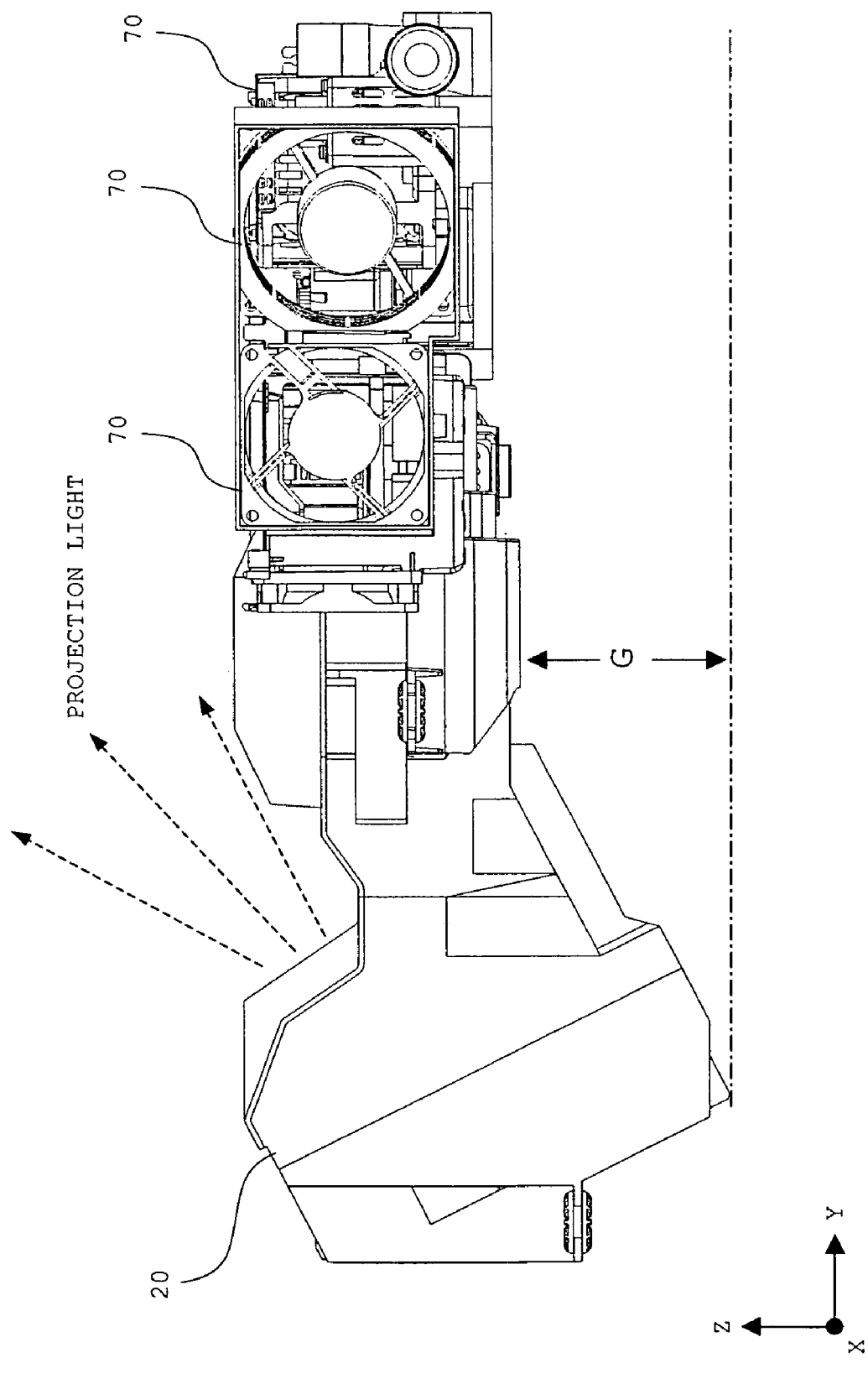
FIG. 5 is a drawing (left side view) illustrating the internal arrangement of the projector according to the embodiment.
Figure 6:
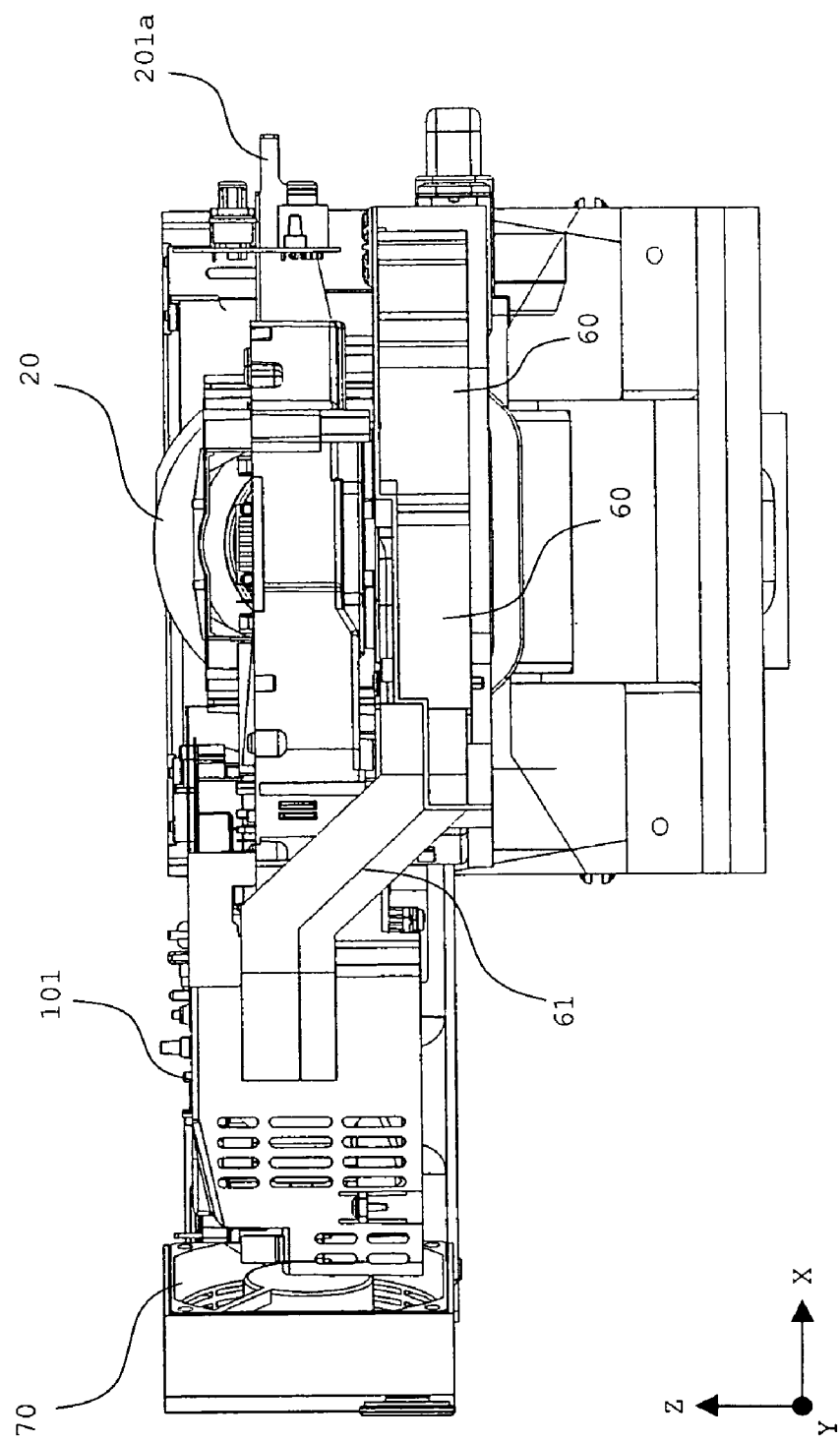
FIG. 6 is a drawing (front view) illustrating the internal arrangement of the projector according to the embodiment.
Figure 7:
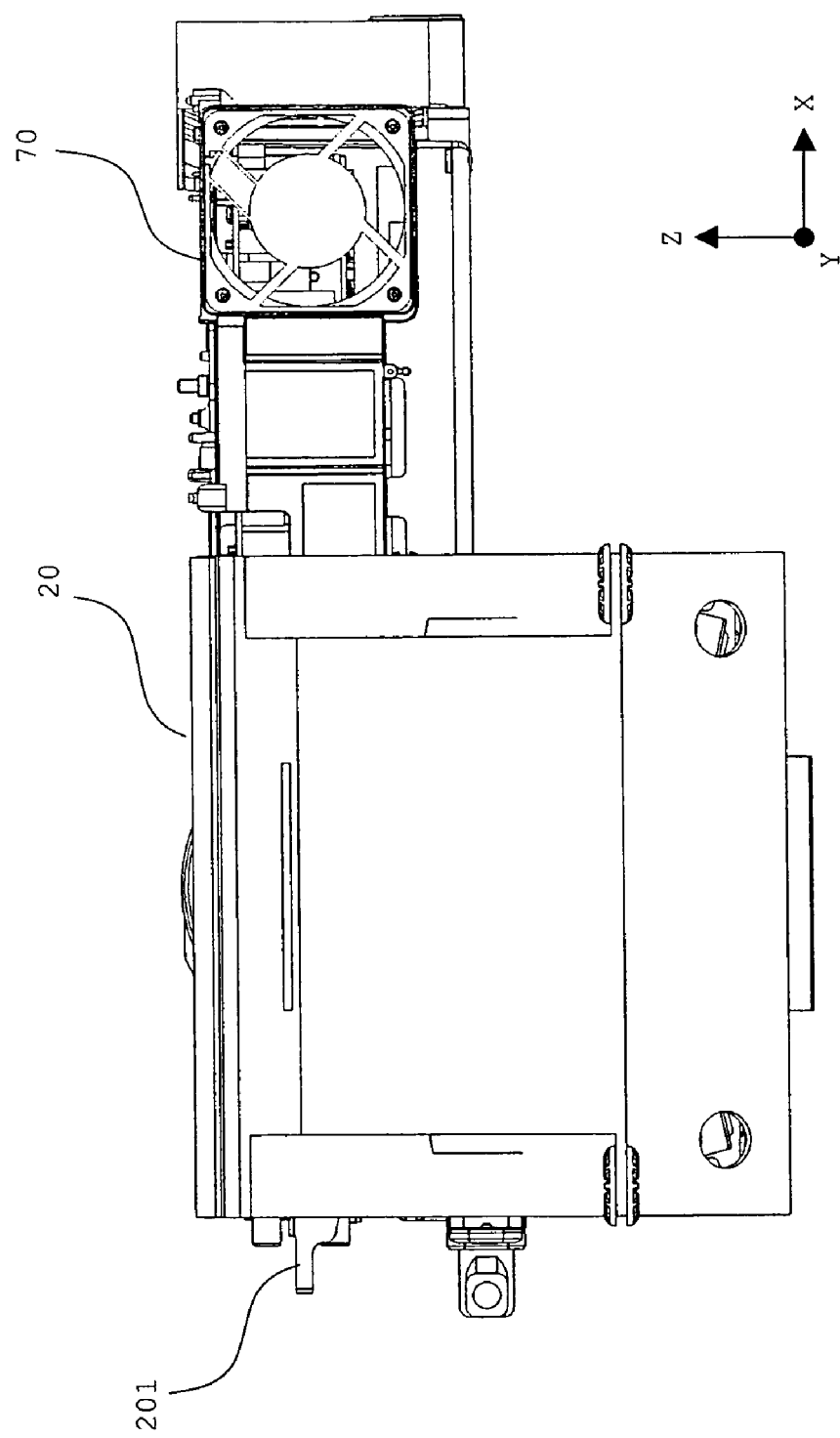
FIG. 7 is a drawing (back view) illustrating the internal arrangement of the projector according to the embodiment.

As shown in FIG. 1 and FIG. 3, three suction fans 60 are disposed on the bottom face side of the optical engine 10. Air sucked by these suction fans 60 is exhausted by an exhaust fan 70 (see FIG. 5) disposed on a left side surface of the optical engine 10 and an exhaust fan 70 (see FIG. 7) disposed on a rear surface of the optical engine 10. Disposition of the suction fans 60 and exhaust fans 70 as mentioned above allows the air sucked by the suction fan 60 to flow passing through an optical system of the optical engine 10, the light source 101, and the power supply unit 30. Furthermore, as shown in FIG. 2, FIG. 3, and FIG. 6, the sucked air is guided to a side surface of the light source 101 via a duct 61 and flows from the side surface of the light source 101 to the exhaust fan 70. Such air flow removes heat generated in these members.

FIG. 8 and FIG. 9 are respectively a perspective view and a cross-sectional view of the projection optical system showing the external appearance. FIG. 9 schematically illustrates an A-A' section in FIG. 8.

In FIG. 8 and FIG. 9, reference number 201 denotes a projection lens unit, reference number 202 denotes a housing, reference number 203 denotes a dust cover, reference number 204 denotes a reflection mirror, reference number 205 denotes a mirror cover, and reference number 206 denotes a light beam passing window.

The projection lens unit 201 comprises a group of lenses for image formation of the projection light onto an intermediate image formation plane, and an actuator for adjusting a focus state of the projected image by displacing a part of the group of lenses in a direction of an optical axis. Here, focus adjustment of the projection lens unit 201 is carried out by rotating a lever 201a around the optical axis of the projection lens unit 201. As shown in FIG. 8, the lever 201a is disposed to protrude from a side surface of the projection lens unit 201 without blocking the projection light from the light beam passing window 206.

The reflection mirror 204 has a reflection plane having an aspheric shape, widens an angle of the projection light entered from the projection lens unit 201, and projects it from the light beam passing window 206 to a projection plane (screen).

The projection lens unit 201 is accommodated in the housing 202, and further, is covered by the dust cover 203. The reflection mirror 204 is attached to the housing 202 and is also covered by the mirror cover 205.

As shown in FIG. 9, synthesized light generated by the optical engine 10 is entered to the projection lens unit 201 at a position spaced from the optical axis of the projection lens unit 201 in a direction of a Z-axis. The synthesized light entered as mentioned is subjected to a lens action by the projection lens unit 201 and is entered to the reflection mirror 204. Following this, the angle of the synthesized light is widened by the reflection mirror 204 and is projected on the projection plane (screen) via the light beam passing window 206.

Figure 4:
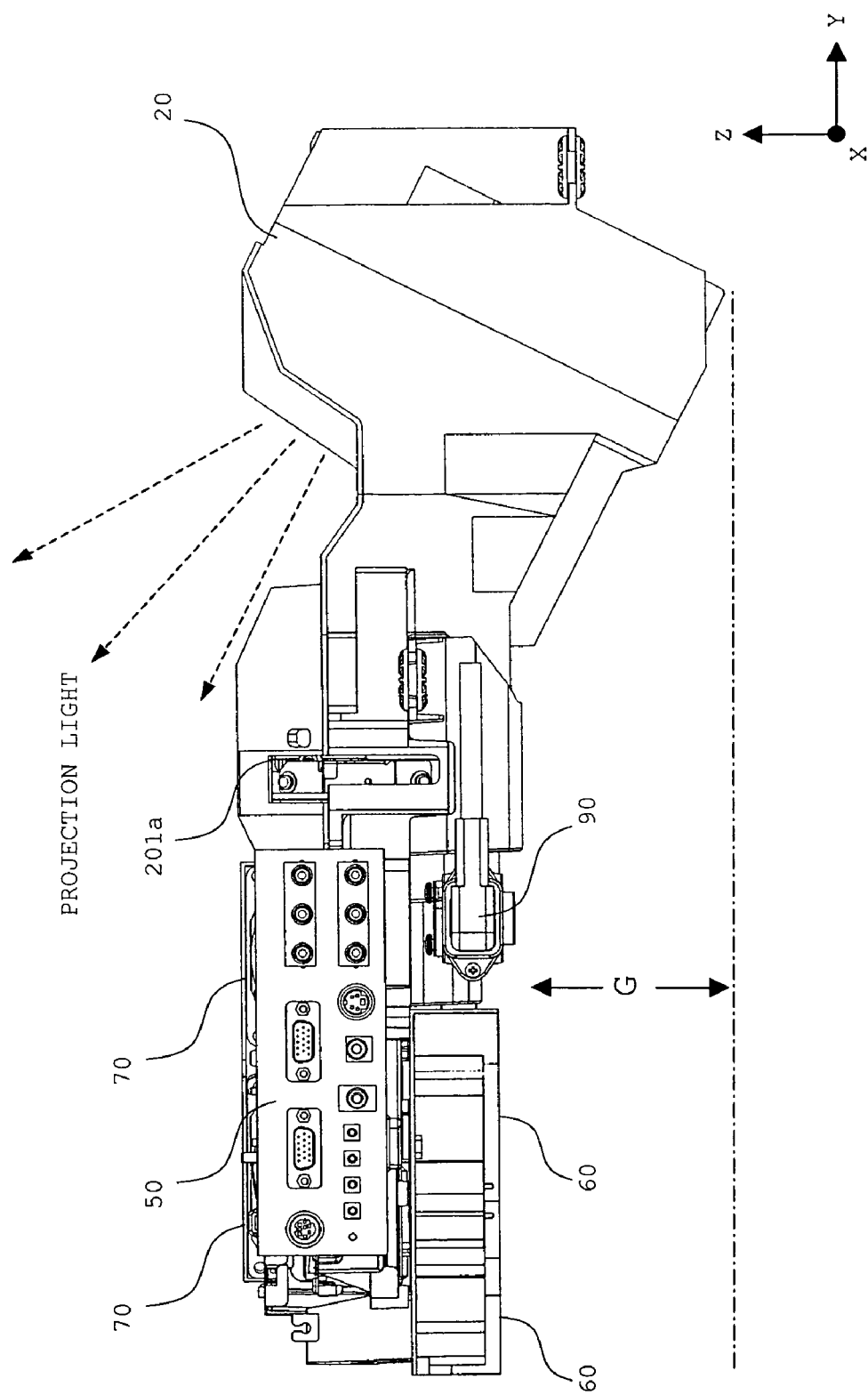
FIG. 4 is a drawing (right side view) illustrating the internal arrangement of the projector according to the embodiment.

As mentioned above, the synthesized light from the optical engine 10 is entered to the projection lens unit 201 at the position shifted from the optical axis of the projection lens unit 201 in the direction of the Z-axis. Therefore, the reflection mirror 204 is disposed to be shifted from the optical axis of the projection lens unit 201 in the direction opposite to the direction of the synthesized light being shifted, as shown in FIG. 9. Here, since the reflection mirror 204 has a larger reflection plane than a lens surface of each of the lenses constituting the projection lens unit 201, an amount of shifting the reflection mirror 204 with regard to the optical axis of the projection lens unit 201 becomes comparatively larger. For this reason, a comparatively large space G is created on the bottom face side of the projector as shown in FIG. 4 and FIG. 5.

Figure 10:
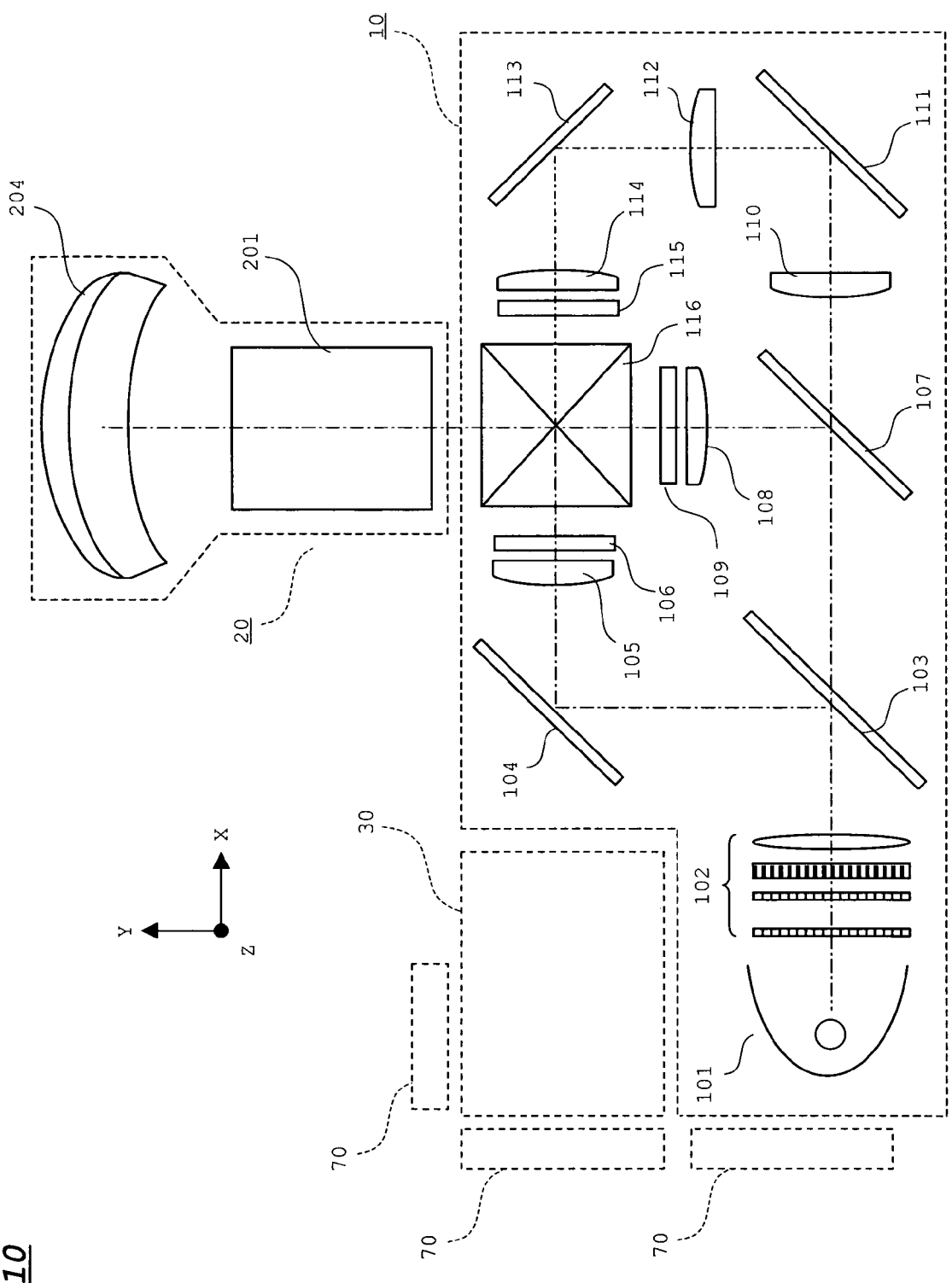
FIG. 10 is a drawing illustrating an arrangement of an optical engine according to the embodiment.

Next, referring to FIG. 10, a principal arrangement of the optical engine 10 will be described.

The light source 101 comprises a burner and a reflector and emits approximately parallel light to an illumination optical system 102. The light source 101 includes, for example, an extra high pressure mercury lamp. The illumination optical system 102 comprises a fly-eye integrator, a PBS (polarization beam splitter) array and a condenser lens. The illumination optical system 102 uniformizes distribution of light quantity of the light of the respective colors when the light are entered to the display elements (liquid crystal panels) 106, 109, and 115, and arranges a direction of polarization of the light traveling to a dichroic mirror 103 in one direction. The light source 101 may be a single light type equipped with only one lamp comprising a burner and a reflector, or a multiple light type equipped with a plurality of lamps.

The dichroic mirror 103 reflects only the light in the blue wavelength band (hereafter, referred to as "B-light"), among the light entered from the illumination optical system 102, and transmits the light in the red wavelength band (hereafter, referred to as "R-light"), and the light in the green wavelength band (hereafter, referred to as "G-light"). A mirror 104 reflects the B-light reflected by the dichroic mirror 103 to a direction to a condenser lens 105.

The condenser lens 105 gives a lens action to the B-light so that the B-light is entered to the display element 106 in a state of parallel light. The display element 106 is driven in response to an image signal for a blue color and modulates the B-light in response to a driven state of the display element 106. A polarization plate (not shown) is disposed at an incident side and emitting side of the display element 106.

A dichroic mirror 107 reflects the G-light only of the R-light and G-light transmitted through the dichroic mirror 103. A condenser lens 108 gives a lens action to the G-light so that the G-light is entered to the display element 109 in a state of parallel light. The display element 109 is driven in response to an image signal for a green color and modulates the G-light in response to a driven state of the display element 109. A polarization plate (not shown) is disposed at an incident side and emitting side of the display element 109.

Relay lenses 110 and 112 give a lens action to the R-light so that an incident state of the R-light with regard to the display element 115 becomes identical with incident states of the B-light and G-light with regard to the display elements 106 and 109. Mirrors 111 and 113 change the optical path of the R-light so as to guide the R-light transmitted through the dichroic mirror 107 to the display element 115.

A condenser lens 114 gives a lens action to the R-light so that the R-light is entered to the display element 115 in a state of parallel light. The display element 115 is driven in response to an image signal for a red color and modulates the R-light in response to a driven state of the display element 115. A polarization plate (not shown) is disposed at an incident side and emitting side of the display element 115.

For the B-light, G-light, and R-light modulated by the display element 106, 109, and 115, a dichroic prism 116 reflects the B-light and R-light, and at the same time, transmits the G-light, thereby performing color synthesis of the B-light, G-light, and R-light. As mentioned above, the color synthesized light (synthesized light) is entered to the projection lens unit 201 in the projection optical system 20. Then, an angle of the synthesized light is widened by the reflection mirror 204, and the synthesized light is projected to the projection plane (screen) via the light beam passing window 206.

As illustrated, the light source 101 is disposed so that a direction of light illumination directs in a direction of the X-axis. With this arrangement of the light source 101, the light source 101 is positioned to illuminate light in the horizontal direction even when the projector is used in any state in use, i.e., used as the ceiling mount type, the stationary type, or the desk mount type. Accordingly, reduction in the service life of the light source 101 due to disposition of the light source 101 in the vertical direction can be suppressed.

Figure 11:
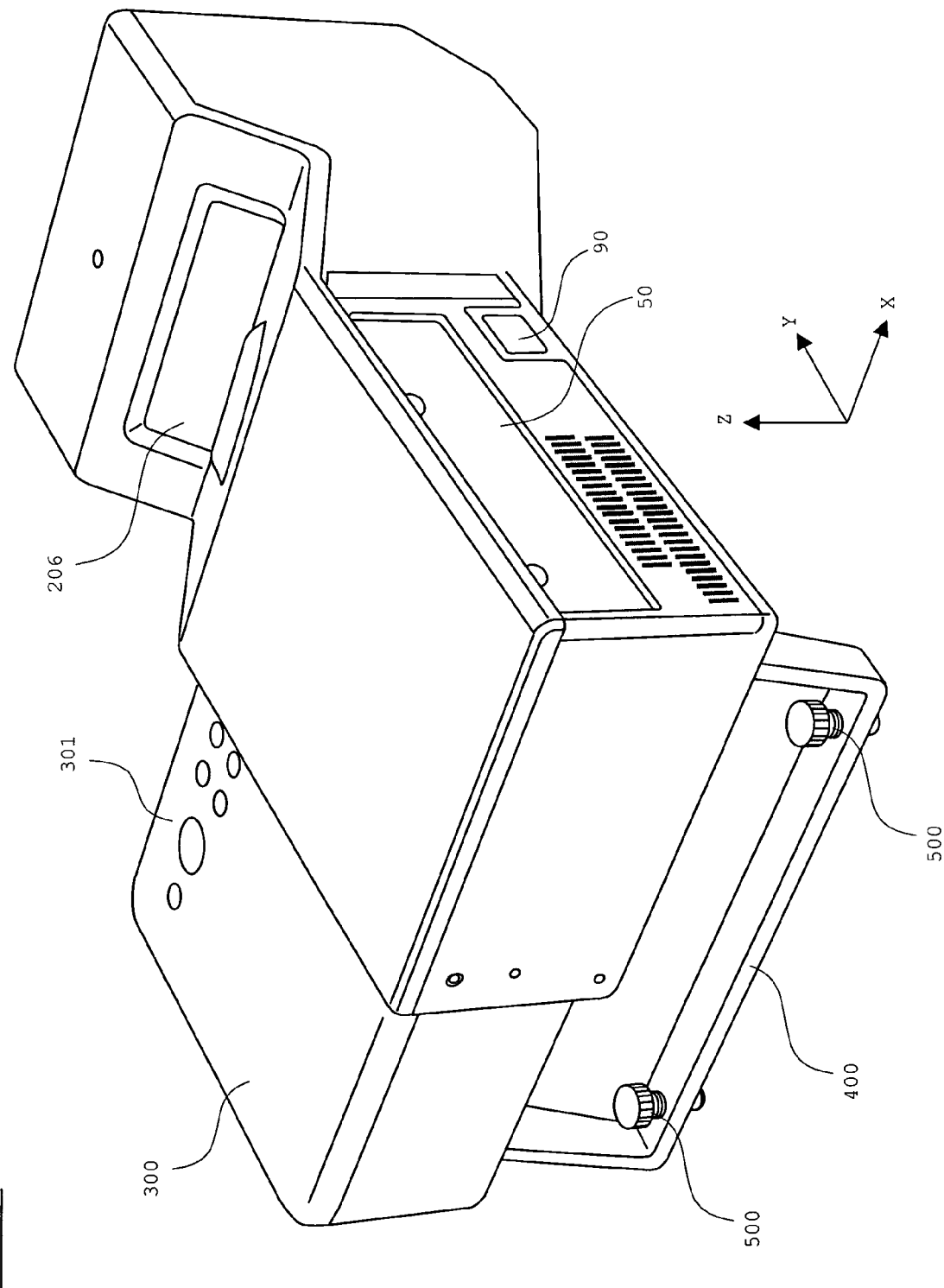
FIG. 11 is a drawing (perspective view) illustrating an external arrangement of the projector according to the embodiment.
Figure 12:
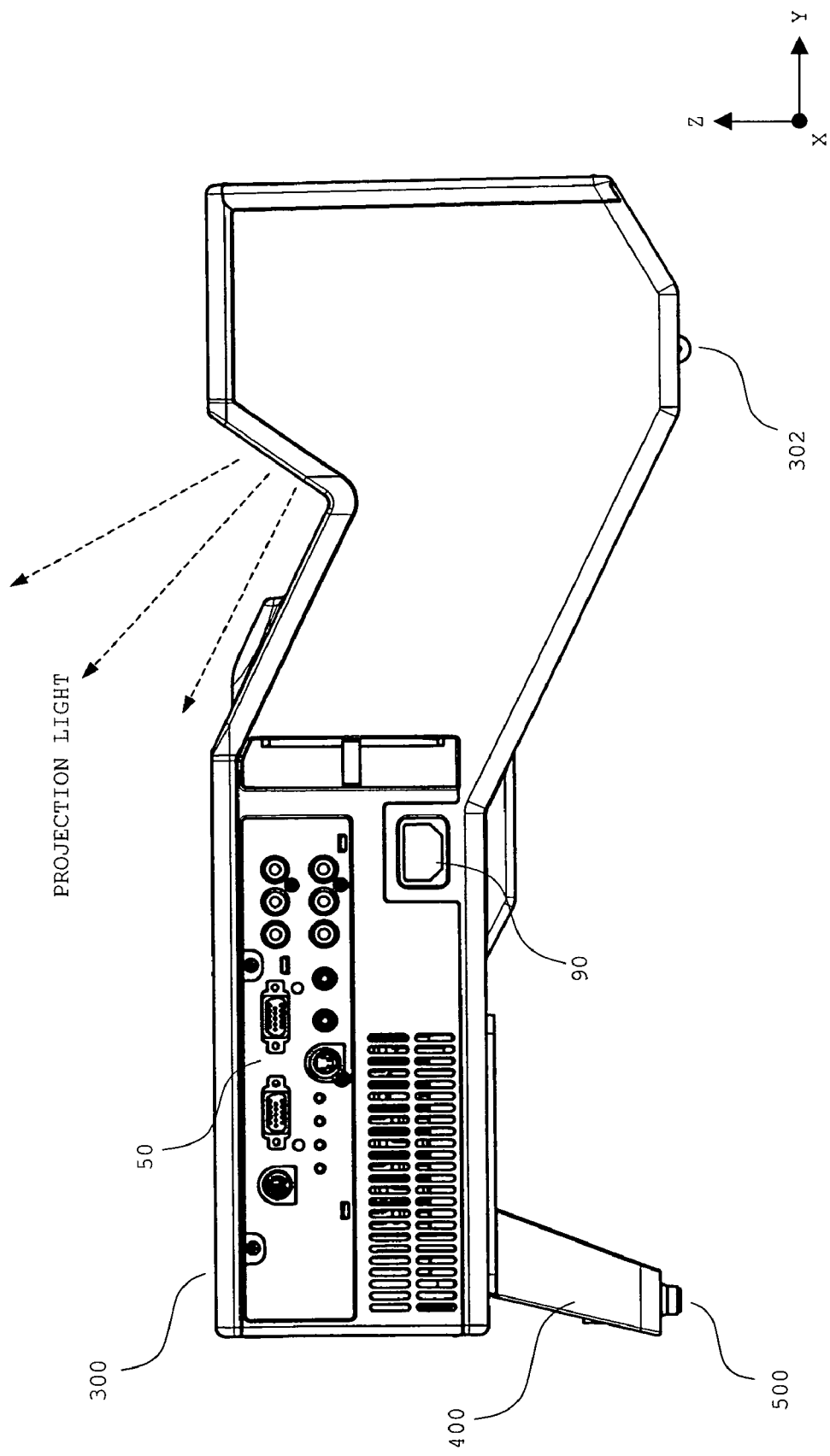
FIG. 12 is a drawing (right side view) illustrating the external arrangement of the projector according to the embodiment.
Figure 13:
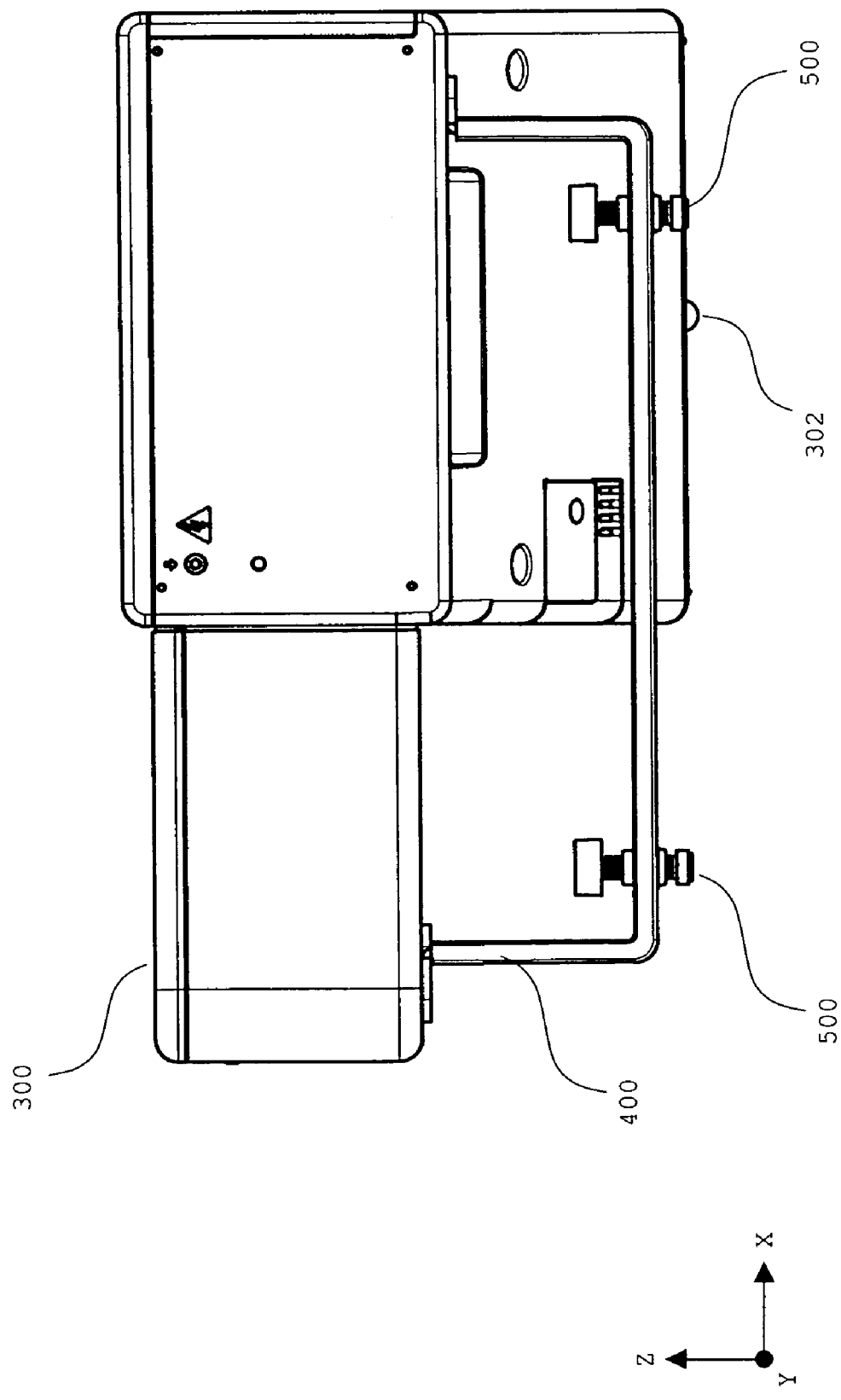
FIG. 13 is a drawing (front view) illustrating the external arrangement of the projector according to the embodiment.
Figure 14:
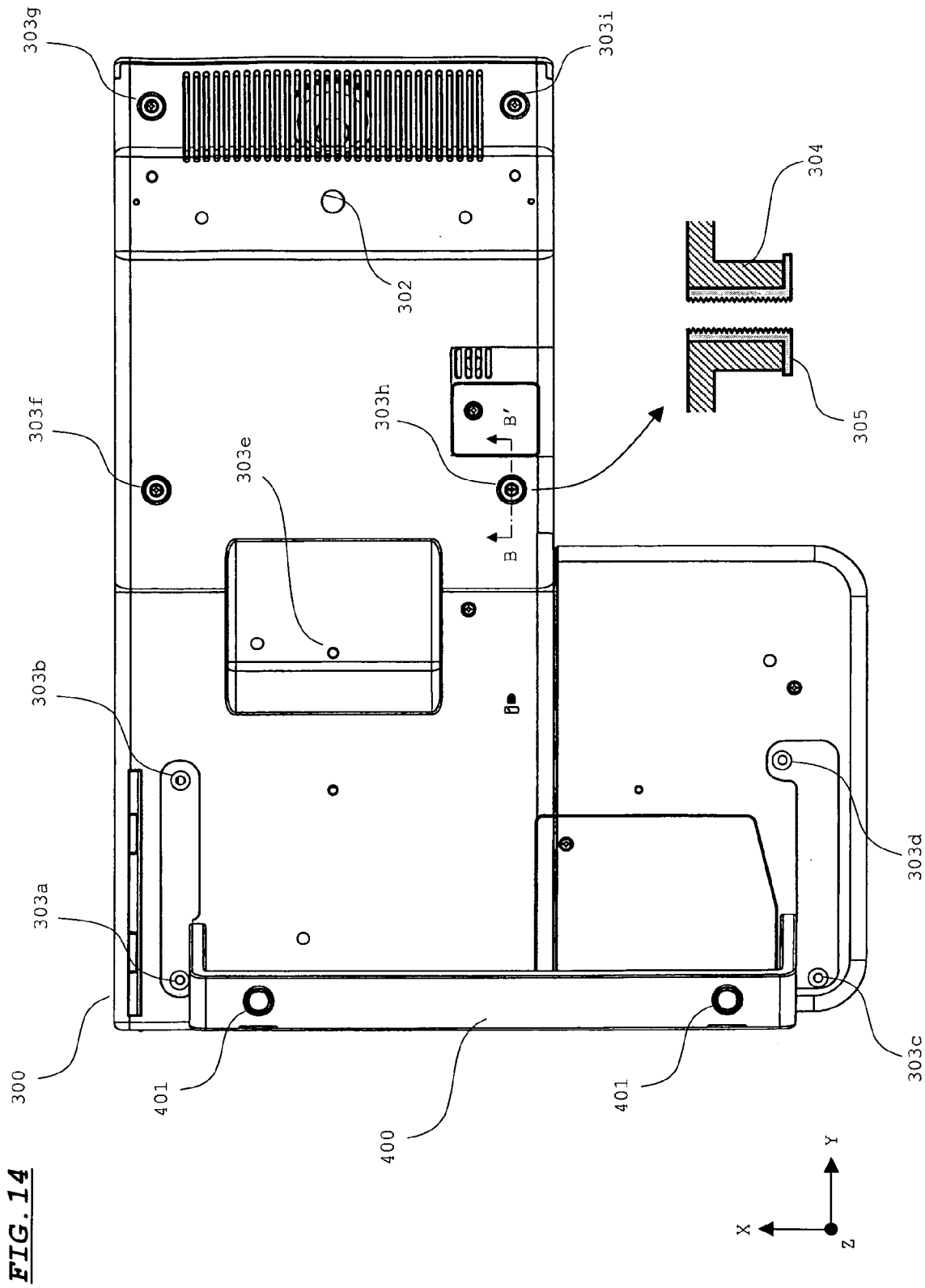
FIG. 14 is a drawing (bottom plan view) illustrating the external arrangement of the projector according to the embodiment.

FIG. 11 is a drawing (perspective view) illustrating an external appearance of the projector where an internal structure of the projector shown in FIG. 1 is accommodated in the cabinet. FIG. 12, FIG. 13, and FIG. 14 are respectively a right side view, a back view, and a bottom plan view.

As illustrated, to correct the level difference created depending on the above-mentioned space G (see FIG. 4 and FIG. 5), an arm member 400 is attached to the bottom face of the main body cabinet 300. Furthermore, two adjusting screws 500 are attached to the arm member 400 so that end portions of the screws may penetrate through the arm member 400.

An operation button section 301 is disposed on the top face of the main body cabinet 300. A protrusion 302 having a circular arc shape is disposed on the bottom face of the main body cabinet 300 at a position where the reflection mirror 204 is disposed.

Figure 15:
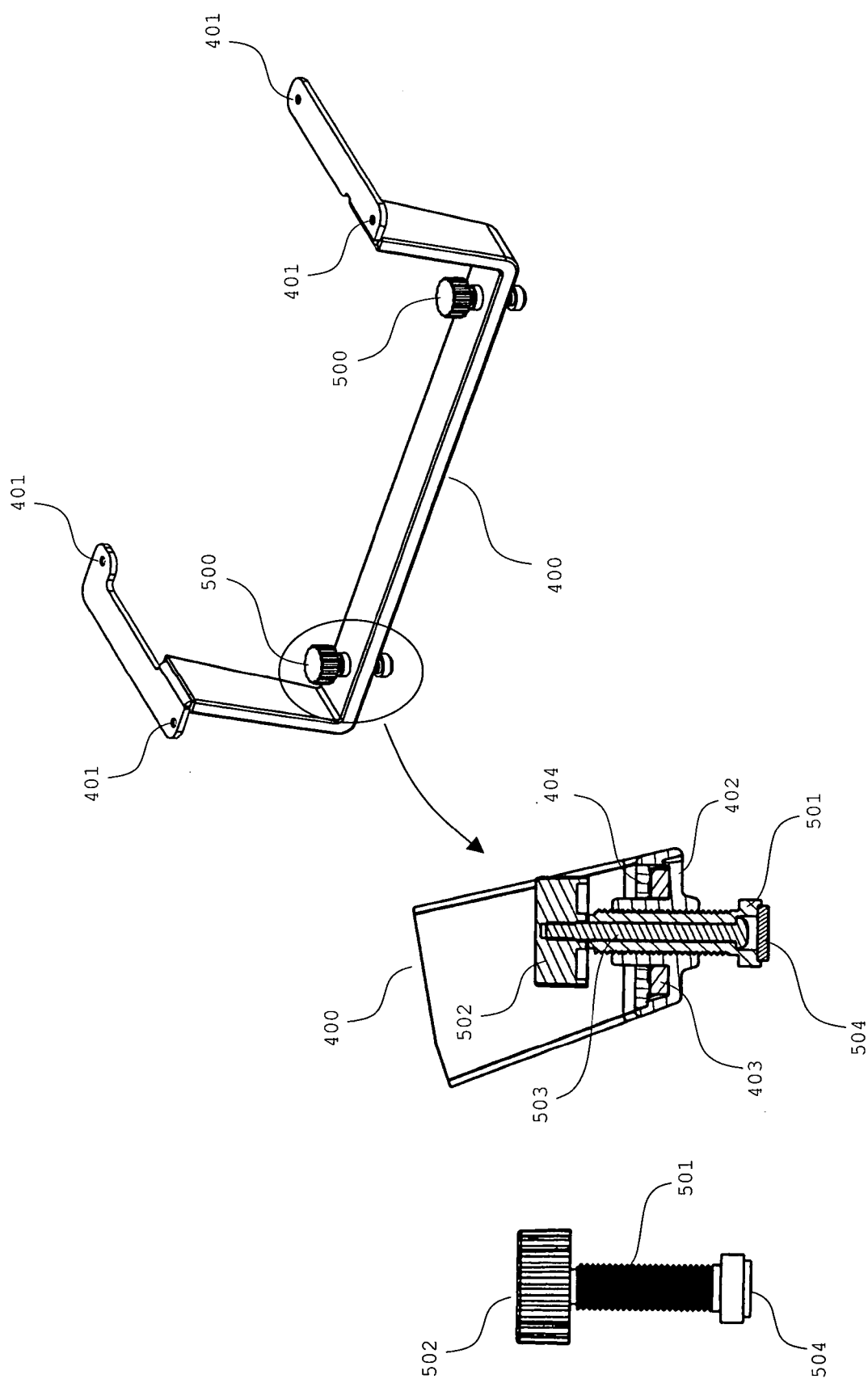
FIG. 15 is a drawing illustrating an arrangement of an arm member and an adjusting screw according to the embodiment.

FIG. 15 illustrates a state that the adjusting screw 500 is attached to the arm member 400. The arm member 400 is formed by molding a resin onto a sheet metal as shown in a right upper area in FIG. 15. In the arm member 400, four holes 401 for securing the arm member 400 by screws to the bottom face of the main body cabinet 300 are formed. A position where the adjusting screws 500 is attached has a structure shown in an enlarged cross-sectional view in FIG. 15.

In the enlarged cross-sectional view, reference number 403 denotes a core sheet metal, and reference numbers 402 and 404 respectively denote a resin molded to a bottom face side of the core sheet metal 403 and a resin molded to a top face side of the core sheet metal 403. A screw hole is integrally formed in the resin 402 at a bottom face side, and a screw member 501 of the adjusting screw 500 is threaded into this hole.

The adjusting screw 500 comprises the screw member 501 and an adjustment dial 502 secured to the screw member 501 by a fixing screw 503. A cushion 504 is attached to an end portion of the screw member 501. An appearance of the adjusting screw 500 is shown at a left end part (side view) in FIG. 15.

The arm member 400 is attached, as shown in FIG. 14, by aligning the holes 401 shown in FIG. 15 to four screw holes 303a through 303d among the screw holes 303a through 303i formed in the bottom face of the main body cabinet 300, and in this state, threading the screws into the screw holes 303a through 303d. The screw holes 303a through 303i all have an insert nut in which as shown in a right lower area in FIG. 14, a nut 305 made of a metal is inserted into a boss hole 304.

When the projector is used for ceiling mount shown in FIG. 18A, the main body cabinet 300 is secured to a mounting mechanism for ceiling mount using all the screw holes 303a through 303i. In this case, the arm member 400 is removed from the main body cabinet 300.

Figure 16:
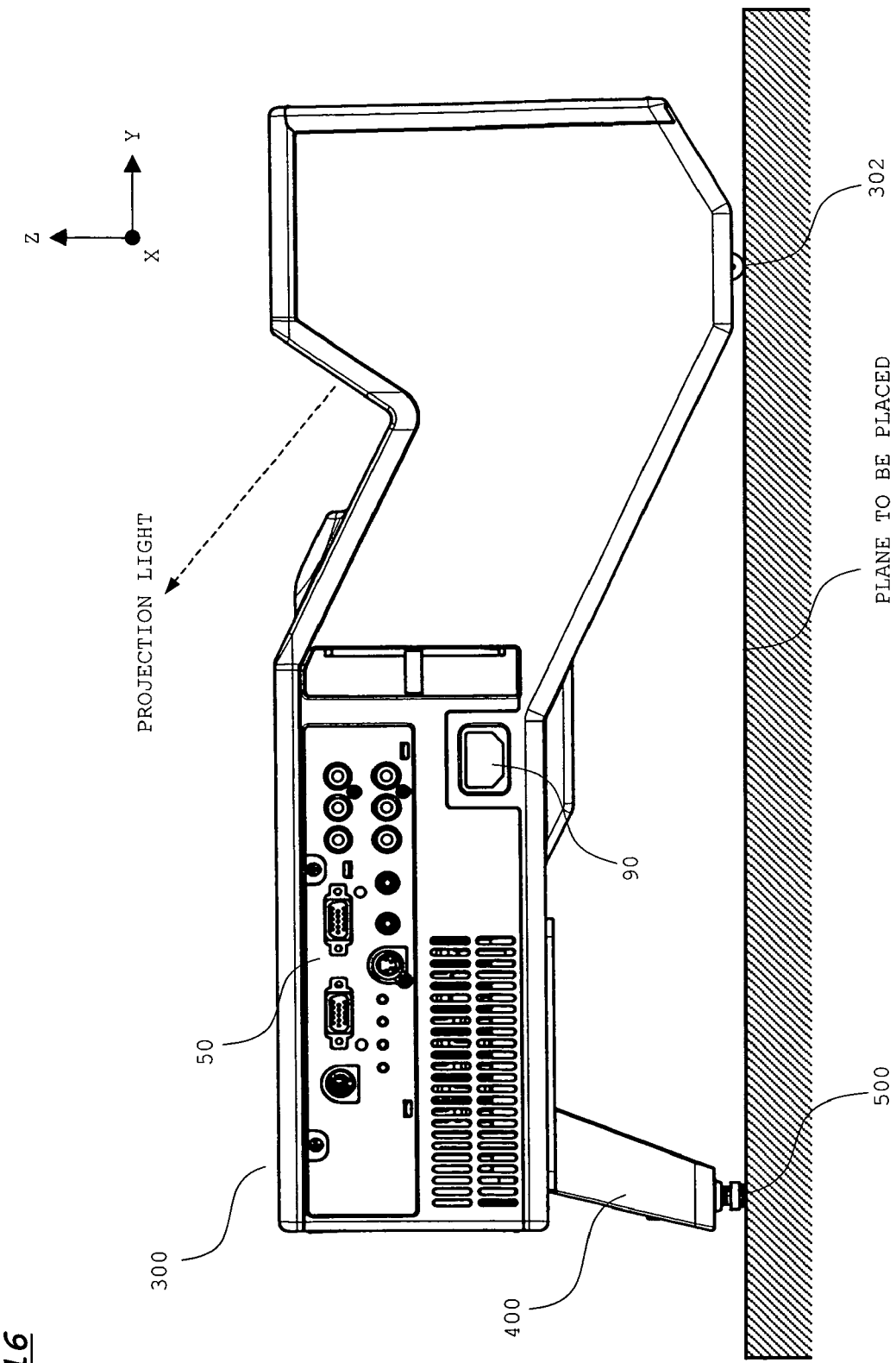
FIG. 16 is a drawing illustrating a state in use (a stationary type) of the projector according to the embodiment.

FIG. 16 is a drawing showing a state when the bottom face of the projector is placed on the plane to be placed (stationary mount). In this state, the protrusion 302 having the circular arc shape disposed at the bottom face of the main body cabinet 300 and the end portions of the two adjusting screws 500 attached to the arm member 400 contact with the plane to be placed. In this state, an amount of protrusion of the adjusting screw 500 with regard to the bottom face of the arm member 400 is at the minimum. In this state, the top face of the main body cabinet 300 is being rotated counterclockwise in the figure by a predetermined angle with regard to the horizontal state.

Figure 17:
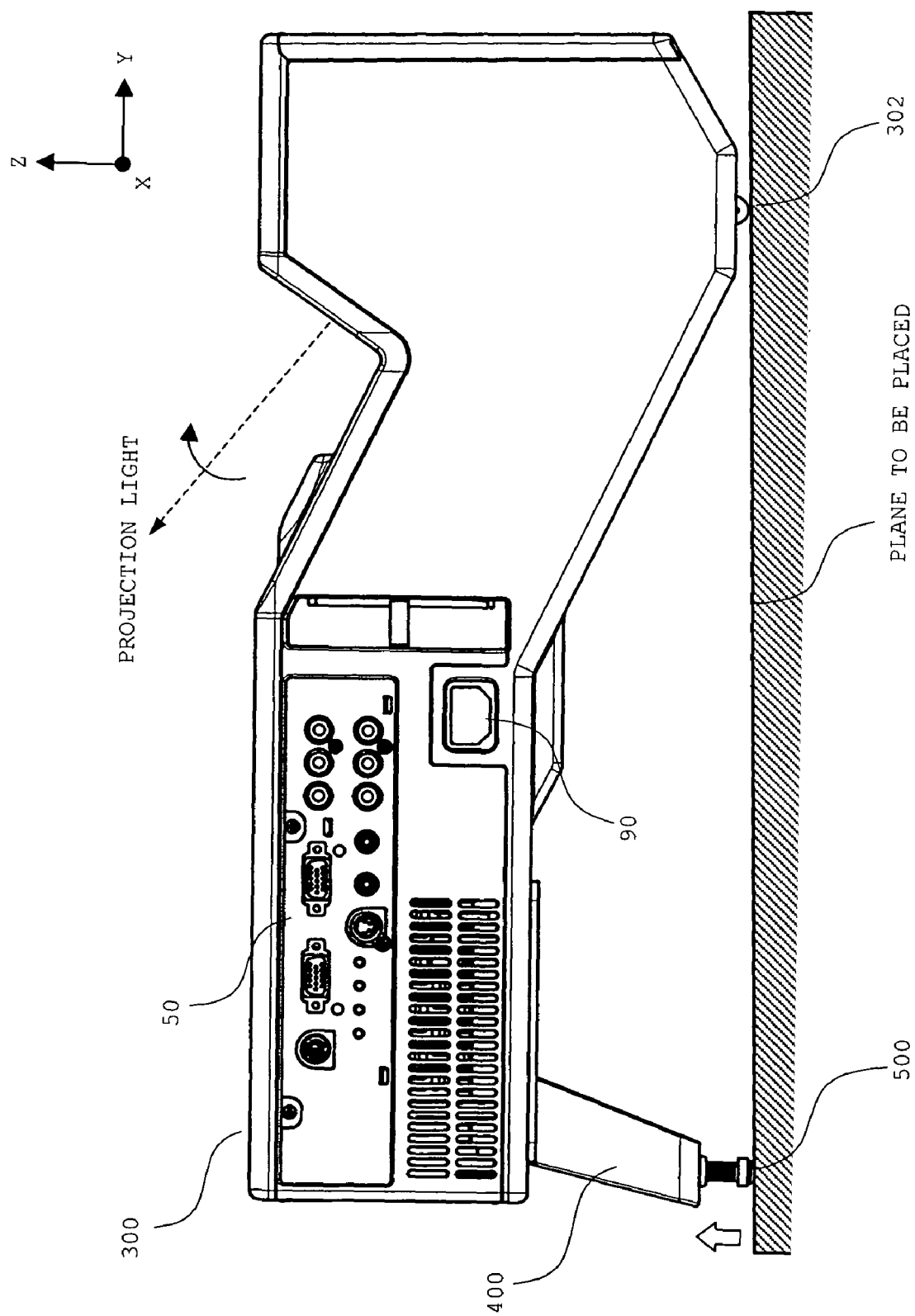
FIG. 17 is a drawing illustrating the state in use (the stationary type) of the projector according to the embodiment.
Figure 19:
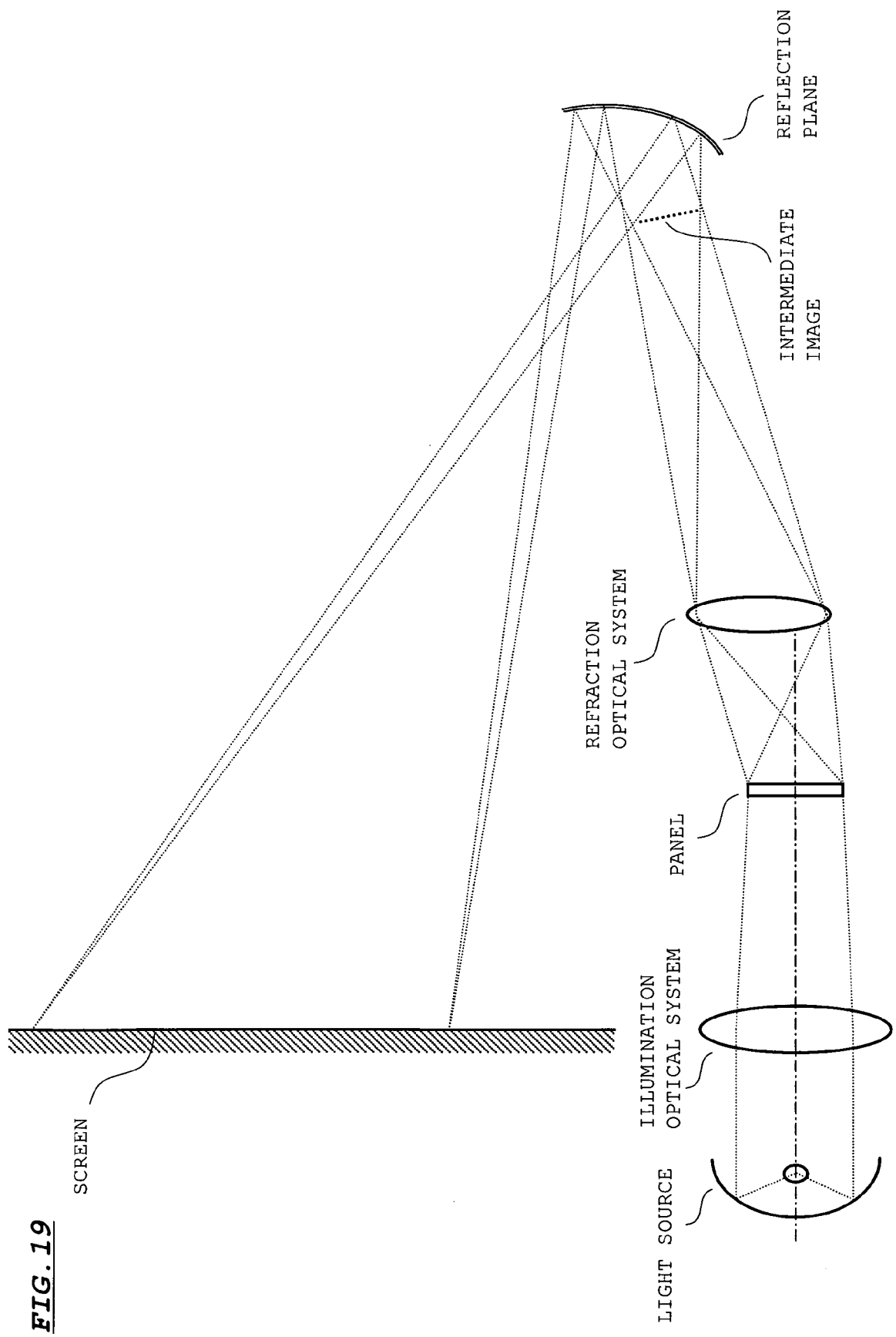
FIG. 19 illustrates the prior art.

When the adjusting screw 500 is rotated from the state shown in the figure and the adjusting screw 500 is further protruded from the bottom face of the arm member 400, the projector rotates clockwise, the protrusion 302 acting as the fulcrum point. Due to this rotation, an orientation of the projection light rotates from the state shown in the figure to the clockwise direction. FIG. 17 illustrates a state when an amount of protrusion of the adjusting screw 500 with regard to the bottom face of the arm member 400 is at the maximum.

Furthermore, the projector can be rotated in an in-plane direction of an X-Z plane by making the amounts of protrusion of the two adjusting screws 500 different, and with this rotation, the orientation of the projection light can be similarly rotated in the in-plane direction of the X-Z plane. Therefore, by properly adjusting the amounts of protrusion of the two adjusting screws 500, a rotational position of the projector can be finely adjusted in both the in-plane direction of the Y-Z plane and the in-plane direction of the X-Z plane. This allows fine adjustment of the orientation of the projection light to an appropriate position in both the in-plane direction of the Y-Z plane and the in-plane direction of the X-Z plane.

According to the present embodiment, when the main body cabinet 300 is placed on the plane to be placed, the bottom face of the main body cabinet facing the plane to be placed, the level difference created on the bottom face side of the main body cabinet 300 is corrected by the arm member 400, and therefore, the projection light can be properly oriented in a direction to projection plane also in the case of stationary mount.

Furthermore, according to the present embodiment, a projecting direction of light can be finely adjusted by properly adjusting the adjusting screws 500, and an image can be properly projected. Since adjustment of the projecting direction of the light can be performed by turning the adjusting screws 500, the adjustment can be performed by an easy and simple operation. Furthermore, according to the present embodiment, since points of action of the two adjusting screws 500 and the protrusion 302 are arranged at apexes of a triangle, the orientation of the projection light can be finely adjusted in a two-dimensional direction, as mentioned above.

Furthermore, according to the present embodiment, since the screw holes 303a through 303d for attaching the arm member 400 are commonly used as the screw holes for ceiling mount, the space on the bottom face of the main body cabinet 300 can be effectively used. Besides, the arm member 400 is unnecessary for ceiling mount, these screw holes 303a through 303d can be used as the screw holes for ceiling mount by removing the arm member 400.

With the present embodiment, since the arm member 400 is formed with a sheet metal, when the arm member 400 is held by chance while carrying the projector, the arm member will not be damaged. Furthermore, since the arm member 400 is attached by threading the arm member to the insert nut having sufficient mechanical strength as previously mentioned, even when the projector is taken up by grasping the arm member 400, the arm member 400 will not be removed and dropped from the projector. In this way, according to the present embodiment, the mechanical strength of the arm member 400 and mounting means thereof is enhanced, damage or accident attributable to direct grasping of the arm member 400 can be obviated.

The embodiment of the present invention has been described as described above, while the present invention is not limited by above-mentioned embodiment. It should be understood that various other modifications and variations may be made to the embodiment of the present invention.

For example, although, in the above-mentioned embodiment, the B-light, G-light, and R-light are modulated by display elements, and the light after modulated are synthesized by the dichroic prism, such an alternative may be used that light in a wavelength band other than in these wavelength bands is further modulated by a corresponding display element, the light after modulated is synthesized together with the B-light, G-light, and R-light and the synthesized light is entered to the projection optical system 20. For example, in a case where there is a spectral component in a yellow wavelength band (hereafter, referred to as "Ye-light") in the light emitted by the light source 101 in addition to the B-light, G-light, and R-light, the Ye-light is guided to the corresponding display element, and the Ye-light modulated by the display element is synthesized by the dichroic prism together with the B-light, G-light, and R-light.

Besides, although a transmission type display element is used as an element for modulating the light of each color in the above-mentioned embodiment, the present invention can be applied to the projector using a reflection type display element. For an issue from which plane of the dichroic prism 116 the light of the respective colors are entered, modifications may be appropriately made in addition to the above-mentioned method.

Furthermore, in the example of the arrangement shown in FIG. 1, although a fly-eye integrator is used as means for giving uniformity to the light, a rod integrator may be used instead.

In the embodiment mentioned above, although the projector using the liquid crystal panels is shown, the present invention can be applied to a projection display device equipped with other image light generation system, e.g., a projector based on the DLP (Digital Light Processing, a trademark of Texas Instruments (TI) Incorporated).

Various modifications and variations may be appropriately applied to the embodiment of the present invention within the technical concepts defined in the scope of claims.

What is claimed is:

1. A projection display device, comprising:
a projection lens section to which light modulated by a light modulating element is entered;
a mirror section for reflecting the light emitted from the projection lens section to a projection plane;
a main body cabinet for accommodating the projection lens section and the mirror section, wherein the main body cabinet includes a first side surface having a light projection port and a second side surface facing the first side surface, and the mirror section is arranged shifted from an optical axis of the projection lens section, and the second side surface is formed to conform to the shifted arrangement of the mirror section with respect to the projection lens section such that the second side surface is at different height levels with respect to a plane on which the second side surface is placed; and a level difference correction section for changing a height level of the second side surface with respect to the plane on which the second side surface is placed to orient the light from the mirror section in a desired direction, when the main body cabinet is placed on the plane on which the second side surface is placed in a state that the second side surface faces the plane.

2. The projection display device according to claim 1, wherein the level difference correction section comprises an adjustment jig for finely adjusting an orientation of the light from the mirror section by changing a distance between the second side surface of the main body cabinet and the plane on which the second side surface is placed.

3. The projection display device according to claim 2, wherein on the second side surface of the main body cabinet, a protrusion is disposed at a position where the mirror section is disposed, and the main body cabinet rotates with the protrusion acting as a fulcrum point, by adjusting the adjustment jig to change the distance between the second side surface of the main body cabinet and the plane on which the second side surface is placed.

4. The projection display device according to claim 3, wherein the adjustment jig is configured so as to change the distance between the second side surface of the main body cabinet and the plane on which the second side surface is placed at two different points, and the protrusion and the adjustment jig are disposed so that the two different points and the protrusion may be positioned at apexes of a triangle.

5. The projection display device according to claim 2, wherein the adjustment jig is an adjustment screw disposed so that an end portion thereof contacts with the plane on which the second side surface is placed.

6. The projection display device according to claim 1, wherein a screw hole for attaching the level difference correction section is formed in the second side surface of the main body cabinet, and the screw hole is commonly used as a screw hole for threading the main body cabinet to a mounting mechanism when the projection display device is used as a ceiling mount type.

* * * * *